US010464281B2

(12) United States Patent
Oehler et al.

(10) Patent No.: US 10,464,281 B2
(45) Date of Patent: Nov. 5, 2019

(54) SANDWICH COMPOSITE WITH SHAPE MEMORY ALLOY CORE AND METHOD OF MAKING SAME

(71) Applicant: The Boeing Company, Huntington Beach, CA (US)

(72) Inventors: Stephen D. Oehler, Renton, WA (US); Frederick T. Calkins, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 740 days.

(21) Appl. No.: 14/462,906

(22) Filed: Aug. 19, 2014

(65) Prior Publication Data

US 2016/0052226 A1 Feb. 25, 2016

(51) Int. Cl.
*B32B 15/04* (2006.01)
*B32B 37/14* (2006.01)
*B32B 3/30* (2006.01)
*B32B 37/00* (2006.01)
*B32B 15/08* (2006.01)
(Continued)

(52) U.S. Cl.
CPC ............... *B32B 3/30* (2013.01); *B32B 15/08* (2013.01); *B32B 15/20* (2013.01); *B32B 27/20* (2013.01); *B32B 37/0076* (2013.01); *B32B 37/144* (2013.01); *B32B 2250/03* (2013.01); *B32B 2250/40* (2013.01); *B32B 2262/106* (2013.01); *B32B 2307/734* (2013.01); *B32B 2311/005* (2013.01); *B32B 2605/18* (2013.01)

(58) Field of Classification Search
CPC ......... B32B 3/30; B32B 15/04; B32B 37/144; B32B 2250/03; B32B 2250/40; B32B 2307/734; B32B 2311/005; B32B 2605/18; Y02T 50/32; Y02T 50/67; Y02T 50/671; Y02T 50/672; Y10T 428/24537; Y10T 428/2457
USPC ............ 244/119–121, 123.1, 123.12–123.14, 244/123.2–123.4, 123.7, 129.1, 130–133; 124/126; 428/467, 457; 156/60
See application file for complete search history.

(56) References Cited

U.S. PATENT DOCUMENTS

| 5,804,276 A | 9/1998 | Jacobs et al. |
| 7,082,837 B2 | 8/2006 | Ogisu et al. |
| 7,710,348 B2 | 5/2010 | Taylor et al. |

(Continued)

*Primary Examiner* — Maria V Ewald
*Assistant Examiner* — Ethan Weydemeyer
(74) *Attorney, Agent, or Firm* — Armstrong Teasdale LLP

(57) ABSTRACT

A composite sandwich structure for a vehicle includes a first sheet that has a first surface and an opposing second surface. The composite sandwich structure also includes a second sheet opposite the first sheet and a core coupled between the first and second sheets. The core is formed from a shape memory alloy and is configured to reversibly transform between (a) a substantially fully austenite state in response to the composite sandwich structure being within an expected operating temperature range and being subjected to a relatively low transverse force, and (b) an at least partially martensite state in response to the composite sandwich structure being within the expected operating temperature range and being subjected to a relatively high transverse force. Each of a plurality of first portions of the core correspondingly changes shape to accommodate the application of the relatively high force, such that the core reversibly deforms.

20 Claims, 4 Drawing Sheets

(51) Int. Cl.
*B32B 15/20* (2006.01)
*B32B 27/20* (2006.01)

(56) References Cited

U.S. PATENT DOCUMENTS

| | | |
|---|---|---|
| 7,897,225 B2 | 3/2011 | Campbell et al. |
| 8,800,590 B2 | 8/2014 | Gilbertson et al. |
| 2004/0175555 A1 | 9/2004 | Ogisu |
| 2005/0121945 A1* | 6/2005 | Browne ................. B62D 35/00 296/180.1 |
| 2005/0158573 A1* | 7/2005 | Elzey ...................... C22F 1/006 428/593 |
| 2011/0030380 A1* | 2/2011 | Widdle, Jr. ............... F02K 1/10 60/771 |
| 2011/0300358 A1* | 12/2011 | Blohowiak ............... B32B 5/12 428/215 |
| 2014/0026679 A1 | 1/2014 | Mankame et al. |
| 2014/0066553 A1 | 3/2014 | Gordon et al. |

* cited by examiner

SANDWICH COMPOSITE WITH SHAPE MEMORY ALLOY CORE AND METHOD OF MAKING SAME

BACKGROUND

The field of the disclosure relates generally to sandwich composites structures, and, more particularly, to a sandwich composite structure with a shape memory alloy core.

At least some known structures, such as aircraft, include structural components formed from sandwich composites. For example, at least some known structural components are formed by coupling, or "sandwiching," a core material between opposing flat sheets. The sheets are typically formed from a relatively light-weight material, for example, a carbon fiber reinforced polymer material. The core typically is formed from a thin metal material, for example aluminum, arranged in a fluted or other suitable shape.

At least some known cores of sandwich composite structures undergo buckling when the sandwich composite is subjected to a high-energy impact from a transverse direction, such as a direction normal to the sheets. At least some such sandwich composites retain little or no transverse load-carrying capability after such impacts. As a result of a risk of such transverse high-energy impacts, at least some known sandwich composites are relegated to use as secondary supporting structures. In addition, repairs after such impacts typically are labor-intensive and costly, and may involve replacement of the metal core.

BRIEF DESCRIPTION

In one aspect, a composite sandwich structure for a vehicle is provided. The composite sandwich structure includes a first sheet that has a first surface and an opposing second surface. A transverse direction is defined normal to the first sheet first surface. The composite sandwich structure also includes a second sheet opposite the first sheet and a core coupled between the first and second sheets. The core is formed from a shape memory alloy. The core is configured to reversibly transform between (a) a substantially fully austenite state in response to the composite sandwich structure being within an expected operating temperature range and being subjected to a relatively low force applied substantially parallel to the transverse direction, and (b) an at least partially martensite state in response to the composite sandwich structure being within the expected operating temperature range and being subjected to a relatively high force applied to the composite sandwich structure substantially parallel to the transverse direction. Each of a plurality of first portions of the core correspondingly changes shape to accommodate the application of the relatively high force, such that the core reversibly deforms.

In another aspect, an aircraft is provided. The aircraft includes a composite sandwich structure. The composite sandwich structure includes a first sheet that has a first surface and an opposing second surface. A transverse direction is defined normal to the first sheet first surface. The composite sandwich structure also includes a second sheet opposite the first sheet and a core coupled between the first and second sheets. The core is formed from a shape memory alloy. The core is configured to reversibly transform between (a) a substantially fully austenite state in response to the composite sandwich structure being within an expected operating temperature range and being subjected to a relatively low force applied substantially parallel to the transverse direction, and (b) an at least partially martensite state in response to the composite sandwich structure being within the expected operating temperature range and being subjected to a relatively high force applied to the composite sandwich structure substantially parallel to the transverse direction. Each of a plurality of first portions of the core correspondingly changes shape to accommodate the application of the relatively high force, such that the core reversibly deforms.

In another aspect, a method of forming a composite sandwich structure for a vehicle is provided. The method includes coupling a core between a first sheet and a second sheet to form the composite sandwich structure. A transverse direction is defined normal to a first surface of the first sheet. The core is formed from a shape memory alloy and is configured to reversibly transform between (a) a substantially fully austenite state in response to the composite sandwich structure being within an expected operating temperature range and being subjected to a relatively low force applied substantially parallel to the transverse direction, and (b) an at least partially martensite state in response to the composite sandwich structure being within the expected operating temperature range and being subjected to a relatively high force applied to the composite sandwich structure substantially parallel to the transverse direction. Each of a plurality of first portions of the core correspondingly changes shape to accommodate the application of the relatively high force, such that the core reversibly deforms.

DETAILED DESCRIPTION

Embodiments of the system and method described herein provide a sandwich composite structure with a shape memory alloy core. The embodiments reduce or eliminate buckling and plastic deformation of the core in response to transverse high-energy impact events. In certain embodiments, the core substantially retains its pre-impact stiffness and/or substantially returns to its pre-impact shape after the high-energy impact event is completed, thereby preserving an ability of the sandwich composite structure to carry a load.

Figure 1:
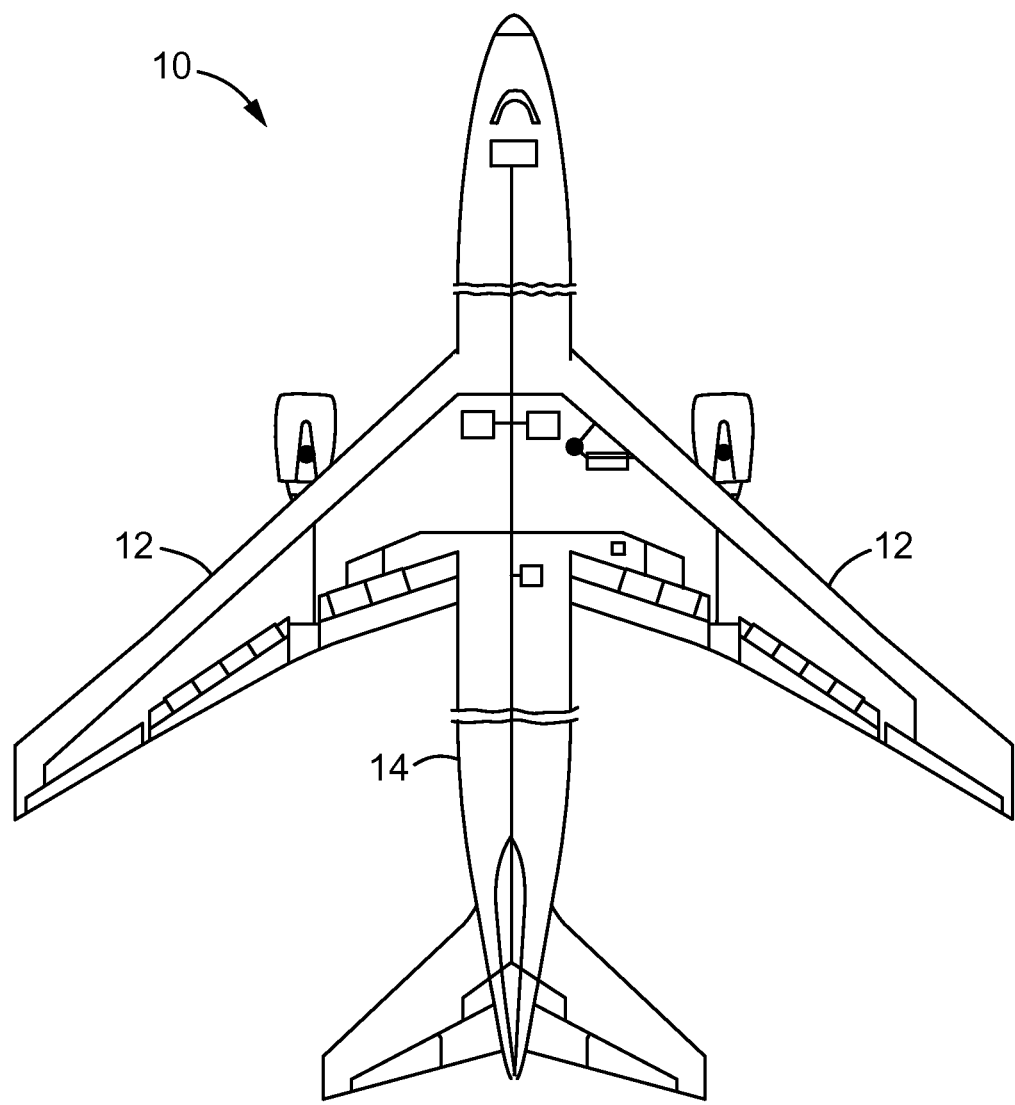
FIG. 1 is a schematic diagram of an exemplary aircraft on which embodiments of a composite sandwich structure may be used.

Referring more particularly to the drawings, implementations of the disclosure may be described in the context of a structure such as an aircraft 10 shown schematically in FIG. 1. Various components of aircraft 10, such as, but not limited to, wings 12 and fuselage 14, include structural components formed from a composite sandwich structure, such as composite sandwich structure 100 shown in FIG. 2. It should be understood, however, that the disclosure applies equally to other structures, including but not limited to automobiles, heavy work vehicles, other vehicles, aquatic vessels, and machinery in general.

Figure 2:
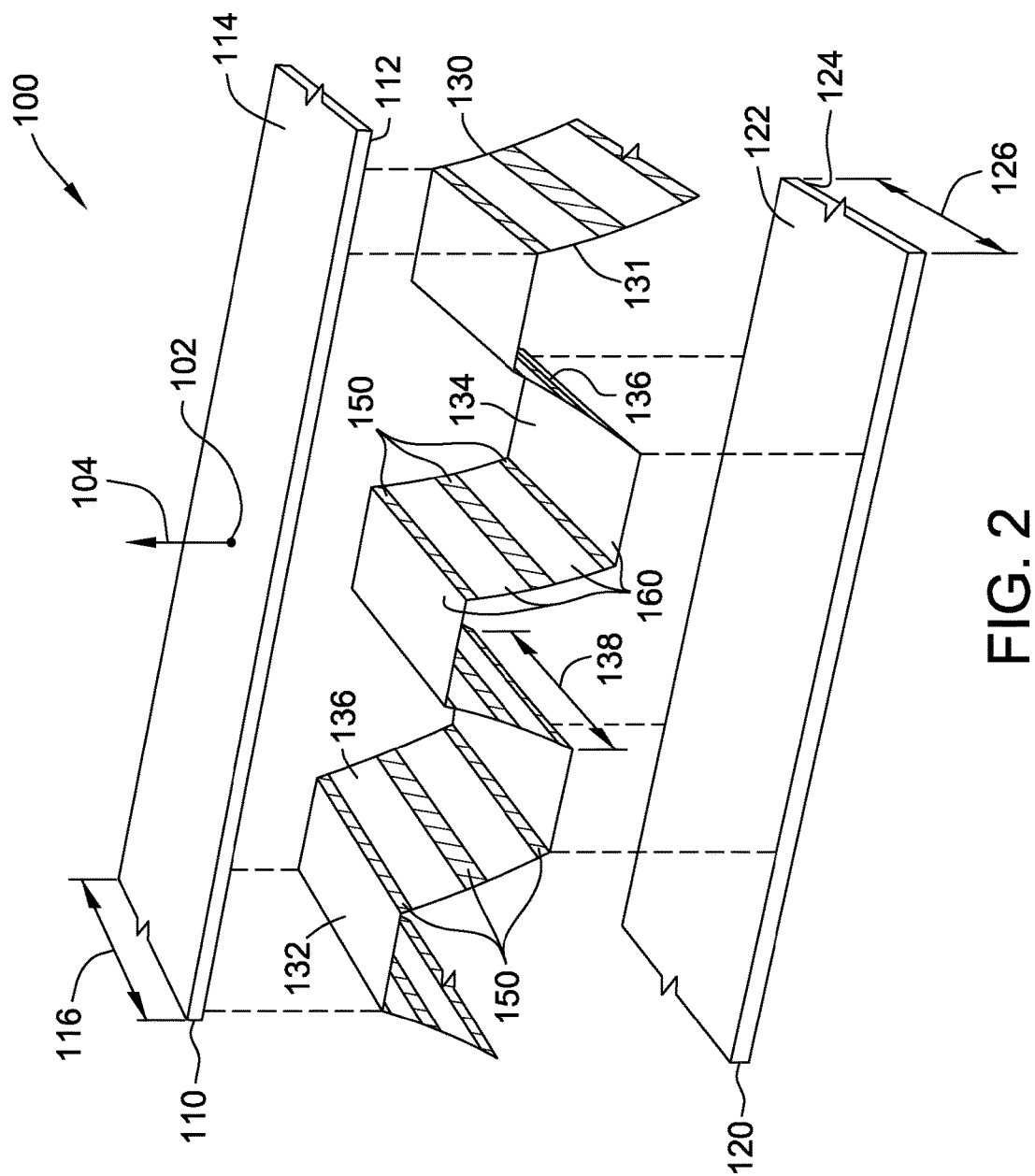
FIG. 2 is an exploded perspective view of a first embodiment of a composite sandwich structure that may be used with the aircraft shown in FIG. 1.

FIG. 2 is an exploded perspective view of a first embodiment of a composite sandwich structure 100 that may be used with, for example, aircraft 10. In the illustrated embodiment, composite sandwich structure 100 includes a first sheet 110 and an opposite second sheet 120. First sheet 110 includes a first surface 112 and an opposing second surface 114. Second sheet 120 includes a first surface 122 and an opposing second surface 124. In an embodiment, each of first sheet 110 and second sheet 120 is formed from a carbon fiber reinforced polymer material. In alternative embodiments, at least one of first sheet 110 and second sheet 120 is formed from another suitable material that enables composite sandwich structure 100 to function as described herein.

Composite sandwich structure 100 also includes a core 130 coupled between first sheet 110 and second sheet 120. In the embodiment illustrated in FIG. 2, core 130 is a thin-walled material formed into a fluted shape. Core 130 includes a plurality of first interface portions 132, a plurality of second interface portions 134, and a plurality of web portions 136. Each web portion 136 extends between one of the plurality of first interface portions 132 and one of the plurality of second interface portions 134. At least one first interface portion 132 is coupled to first sheet 110, and at least one second interface portion 134 is coupled to second sheet 120. In an embodiment, a suitable adhesive is used to couple the at least one first interface portion 132 to first sheet 110 and the at least one second interface portion 134 to second sheet 120. In alternative embodiments, the at least one interface portions 132 and 134 are coupled to first sheet 110 and second sheet 120, respectively, by any suitable structure that enables composite sandwich structure 100 to function as described herein.

It should be understood that, in alternative embodiments, core 130 may have configurations other than the illustrated fluted shape. For example, but not by way of limitation, at least one of any of first interface portion 132, second interface portion 134, and web portion 136 may have a curved shape, a spline shape, and/or any other suitable shape.

At each point 102 on first sheet 110 and on second sheet 120, a transverse direction 104 may be defined normal to a surface of the respective one of sheets 110 and 120 at that point. In the illustrated embodiment, each of first sheet 110 and second sheet 120 is substantially flat, and each first interface portion 132 and second interface portion 134 is substantially parallel to first sheet 110 and second sheet 120. In alternative embodiments, first sheet 110 and second sheet 120 have curved shapes, each first interface portion 132 is substantially complementary to an adjacent portion of first sheet 110, and each second interface portion 134 is substantially complementary to an adjacent portion of second sheet 120. Additionally, in the illustrated embodiment, each of a width 116 of first sheet 110 and a width 126 of second sheet 120 is substantially equal to a width 138 of core 130. In alternative embodiments, at least one of width 116, width 126, and width 138 is not substantially equal to another of width 116, width 126, and width 138.

Core 130 is formed from a shape memory alloy 131. A shape memory alloy is one that is subject to a reversible solid-state phase transformation between two crystal phases, an austenitic (or "parent") phase and a martensitic (or "child") phase. For example, but not by way of limitation, core 130 is formed from a nickel-titanium based alloy, sometimes referred to as Nitinol. The phase transformation may be triggered by, for example, a suitable temperature change or a suitable application of mechanical force. In an absence of structural constraints, the phase transformation is accompanied by a corresponding shape change between the austenitic phase and the martensitic phase.

Generally, in an absence of other phase-change triggers, core 130 is in a substantially fully austenite state above a relatively high temperature and in a substantially fully martensite state below a relatively low temperature. For purposes of this disclosure, core 130 is in a "substantially fully austenite state" if at least 95 percent of core 130 is in the austenite state, and core 130 is in a "substantially fully martensite state" when at least 95 percent of core 130 is in the martensite state. An austenite finish transition temperature is defined for shape memory alloy 131 as a temperature at which a phase transformation from the martensite state to the austenite state is complete.

In the embodiment illustrated in FIG. 2, core 130 is divided into a plurality of first portions 150 and a plurality of second portions 160, for reasons that will be described herein. In addition, composite sandwich structure 100 is at a temperature greater than the austenite finish transition temperature, and composite sandwich structure 100 is subjected to a relatively low force applied substantially parallel to transverse direction 104. In response, core 130, including each of first portions 150 and second portions 160, is in the substantially fully austenite state. Moreover, in certain embodiments, core 130 has a stiffness in the substantially fully austenite state such that composite sandwich structure 100 is configured to carry a corresponding load. Additionally, in certain embodiments, first sheet 110 and second sheet 120 provide relatively little or no structural stiffness in transverse direction 104.

In certain embodiments, core 130 is formed from a shape memory alloy 131 that exhibits superelastic properties within a predetermined superelastic temperature range. The superelastic temperature range of a shape memory alloy typically has a lower end value at about the austenite finish transition temperature. In particular, at least a substantial portion of the superelastic temperature range is above the austenite finish transition temperature of the shape memory alloy. When core 130 is within the superelastic temperature range and is subjected to a relatively high force, at least a portion of core 130 transforms to the martensite phase and correspondingly changes shape. When the relatively high force is removed, core 130 spontaneously returns to its original shape. In an embodiment, within the superelastic temperature range, core 130 exhibits elastic deformation under stresses up to about 10 to about 30 times higher than a yield stress of a typical non-shape-memory metal or alloy. In alternative embodiments, core 130 exhibits elastic deformation under stresses up to other than about 10 to about 30 times higher than a yield stress of a typical non-shape-memory metal or alloy.

The numerical values of the "relatively high force" that causes at least a portion of core 130 to transform to the martensite phase and of the "relatively low force" that causes core 130 to be in the substantially fully austenite phase depend upon the particular shape memory alloy 131 selected for core 130. More specifically, if core 130 is initially in the substantially fully austenite state, the "relatively high force" is one that induces a stress in first portions 150 greater than or equal to an upper plateau stress defined for the selected shape memory alloy 131. For example, shape memory alloy 131 is selected such that the upper plateau stress is in a range of from about 200 MPa to about 1,000 MPa. For another example, shape memory alloy 131 is selected such that the upper plateau stress is in a range of from about 250 MPa to about 600 MPa. For another example, shape memory alloy 131 is selected such that the upper plateau stress is in a range of from about 400 MPa to about 650 MPa. For another example, shape memory alloy 131 is selected such that the upper plateau stress is any suitable value. Similarly, if core 130 is in the substantially fully austenite state, the "relatively low force" is one that induces a stress in first portions 150 that is less than the upper plateau stress defined for the selected shape memory alloy 131. However, if core 130 is initially in an at least partially martensite state, the "relatively low force" is one that induces a stress in first portions 150 that is less than or equal to a lower plateau stress defined for the selected shape memory alloy 131. It should be understood that, for at least some shape memory alloys, the lower plateau stress is not identical to the upper plateau stress. For example, shape memory alloy 131 is selected such that the lower plateau stress is in a range of from about 0 MPa to about 600 MPa. For another example, shape memory alloy 131 is selected such that the lower plateau stress is in a range of from about 0 MPa to about 450 MPa. For another example, shape memory alloy 131 is selected such that the lower plateau stress is in a range of from about 0 MPa to about 350 MPa. For another example, shape memory alloy 131 is selected such that the lower plateau stress is any suitable value. It should be understood that, for at least some shape memory alloys, at least one of the upper plateau stress and the lower plateau stress vary with temperature.

In certain embodiments, shape memory alloy 131 from which core 130 is formed is chosen such that an expected operating temperature range for composite sandwich structure 100 is substantially contained within the superelastic temperature range of core 130. In a particular embodiment, core 130 is formed from shape memory alloy 131 with an austenite finish transition temperature that is less than or equal to a lower end value of an expected operating temperature range for composite sandwich structure 100. For example, the austenite finish transition temperature is within a range of about −35 degrees Celsius to about −10 degrees Celsius, and the expected operating temperature range is from about −10 degrees Celsius to about 45 degrees Celsius. For another example, the austenite finish transition temperature is about −15 degrees Celsius, and the expected operating temperature range for composite sandwich structure 100 is from about −15 degrees Celsius to about 40 degrees Celsius. In alternative embodiments, core 130 is formed from shape memory alloy 131 with an austenite finish transition temperature that is other than at, or slightly below, the lower end value of the expected operating temperature range for composite sandwich structure 100.

Figure 3:
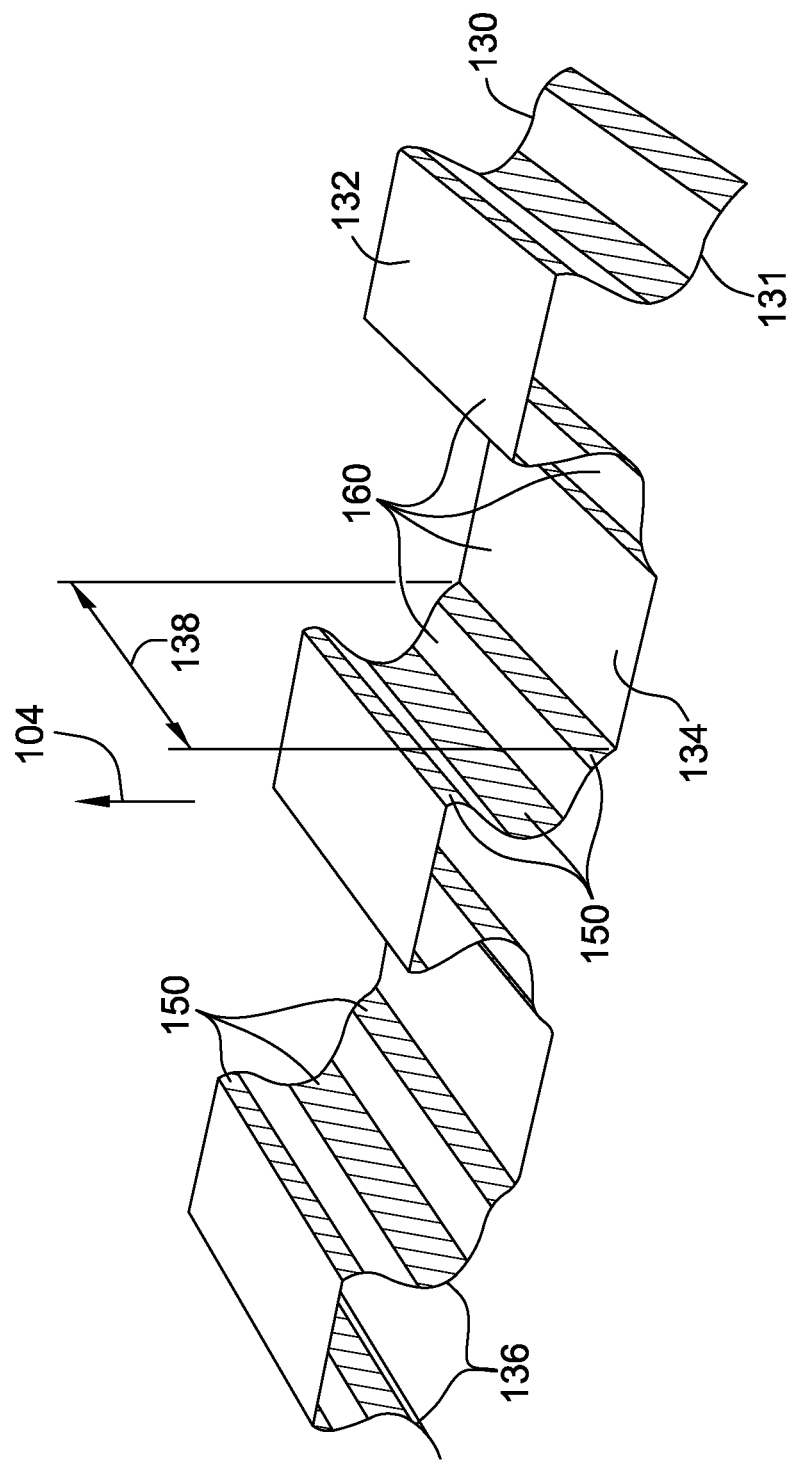
FIG. 3 is a perspective view of a core of the composite sandwich structure shown in FIG. 2 subjected to a relatively high force applied substantially parallel to a transverse direction.

FIG. 3 is a perspective view of core 130 of composite sandwich structure 100 while composite sandwich structure 100 is subjected to a relatively high force applied substantially parallel to transverse direction 104. In the illustrated embodiment, composite sandwich structure 100 is at a temperature within the superelastic temperature range, and the relatively high force is sufficiently high to cause superelastic behavior in core 130. For example, but not by way of limitation, the relatively high force results from a high-energy impact to second surface 114 of first sheet 110 (shown in FIG. 2) from a direction having a component substantially parallel to transverse direction 104.

As shown in the illustrated embodiment, core 130 is in an at least partially martensite state in response to core 130 being subjected to the relatively high force. More specifically, each of first portions 150 transforms at least partially to the martensite state when core 130 is subjected to the relatively high force. Each first portion 150 correspondingly changes shape as compared to its shape (as shown in FIG. 2) when core 130 is subjected to the relatively low force applied substantially parallel to transverse direction 104. The shape change of plurality of first portions 150 substantially accommodates the application of the relatively high force to composite sandwich structure 100 substantially parallel to transverse direction 104, such that core 130 reversibly deforms.

Also as shown in the illustrated embodiment, each of second portions 160 remains in the substantially fully austenite state when core 130 is subjected to the relatively high force, and correspondingly does not change shape as compared to its shape when core 130 is subjected to the relatively low force. It should be understood that, for a different relatively high force, first portions 150 and second portions 160 may be distributed differently. The different relatively high force may arise, for example, but not by way of limitation, from a high-energy impact to second surface 114 of first sheet 110 (shown in FIG. 2) that imparts a different amount of energy substantially parallel to transverse direction 104.

With reference to FIGS. 2 and 3, with core 130 remaining at a temperature within the superelastic temperature range, when the relatively high force applied substantially parallel to transverse direction 104 is removed, such as, but not by way of limitation, immediately after a high-energy impact event, each of first portions 150 returns to the substantially fully austenite state. As a result of the superelastic properties of core 130, core 130 is not permanently buckled or deformed, and core 130 correspondingly returns to the shape illustrated in FIG. 2. Moreover, after core 130 has transformed to the at least partially martensite state and back to the substantially fully austenite state, core 130 substantially retains the stiffness that characterized core 130 in the substantially fully austenite state prior to the application of the relatively high force, such that composite sandwich structure 100 is configured to carry substantially the same corresponding load. For example, core 130 retains at least 95 percent of the stiffness that characterized core 130 in the substantially fully austenite state prior to the application of the relatively high force.

Figure 4:
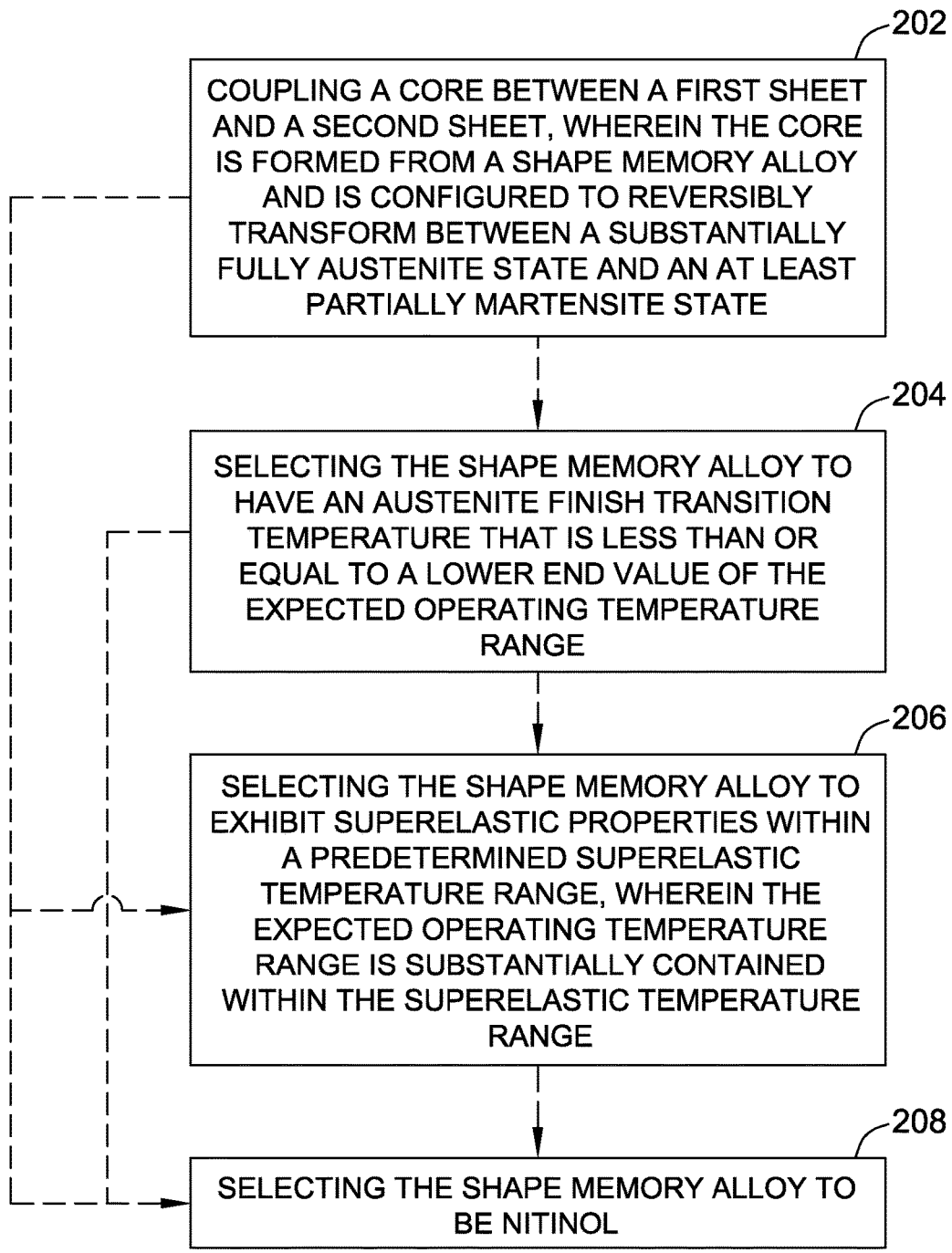
FIG. 4 is a flowchart of an embodiment of a method of forming a composite sandwich structure, such as the composite sandwich structure shown in FIG. 2.

FIG. 4 is a flowchart of an embodiment of a method 200 of forming a composite sandwich structure, such as composite sandwich structure 100. Method 200 includes coupling 202 a core, such as core 130, between a first sheet, such as first sheet 110, and a second sheet, such as second sheet 120, to form the composite sandwich structure. A transverse direction, such as transverse direction 104, is defined normal to a surface, such as second surface 114, of the first sheet. The core is formed from a shape memory alloy, such as shape memory alloy 131, and is configured to reversibly transform between (a) a substantially fully austenite state, in response to the composite sandwich structure being within an expected operating temperature range and being subjected to a relatively low force applied substantially parallel to the transverse direction, and (b) an at least partially martensite state, in response to the composite sandwich structure being within the expected operating temperature range and being subjected to a relatively high force applied to the composite sandwich structure substantially parallel to the transverse direction. Each of a plurality of first portions, such as first portions 150, of the core correspondingly changes shape to accommodate the application of the relatively high force, such that the core reversibly deforms.

In certain embodiments, method 200 further includes selecting 204 the shape memory alloy to have an austenite finish transition temperature that is less than or equal to a lower end value of the expected operating temperature range. Additionally, in some embodiments, method 200 also includes selecting 206 the shape memory alloy to exhibit superelastic properties within a predetermined superelastic temperature range, wherein the expected operating temperature range is substantially contained within the superelastic temperature range. In a particular embodiment, method 200 includes selecting 208 the shape memory alloy to be Nitinol.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the disclosure may be applied to other industries, such as the automotive industry.

The embodiments described herein provide a composite sandwich structure and a method for forming composite sandwich structures. The embodiments provide a composite sandwich structure configured to reversibly transform between a substantially fully austenite state, in response to the composite sandwich structure being within an expected operating temperature range and being subjected to a relatively low force applied substantially parallel to a transverse direction, and an at least partially martensite state, in response to the composite sandwich structure being within the expected operating temperature range and being subjected to a relatively high force applied to the composite sandwich structure substantially parallel to the transverse direction. The embodiments provide a plurality of first portions of the core that correspondingly change shape to accommodate the application of the relatively high force, such that the core reversibly deforms.

The embodiments described herein provide improvements over at least some composite sandwich structural components. As compared to at least some known composite sandwich structural components, the composite sandwich structure described herein provides a stiffness in the substantially fully austenite state that is substantially retained after the core has transformed to the at least partially martensite state and back to the substantially fully austenite state. In addition, the embodiments described herein reduce or eliminate permanent buckling and plastic deformation of the core in response to a high-energy impact event to the composite sandwich structure. As such, the embodiments provided herein enable the composite sandwich structure to substantially retain a load-carrying capability after a high-energy impact event. Thus, the embodiments described herein facilitate a reduction of costly repairs or replacements of the core, and facilitate a use of the composite sandwich structure as a primary structural component in certain applications.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite sandwich structure for a vehicle, said composite sandwich structure comprising:
   a first sheet comprising a first surface and an opposing second surface, wherein a transverse direction is defined normal to said second surface of said first sheet;
   a second sheet opposite said first sheet; and
   a core coupled between said first and second sheets, said core is formed from a shape memory alloy having an austenite finish transition temperature within a range of about −35 degrees Celsius to about −10 degrees Celsius, said shape memory alloy comprises a plurality of web portions that each extend from said first sheet to said second sheet, said core is configured to reversibly transform between:
   a substantially fully austenite state in response to said composite sandwich structure being subjected to a relatively low force applied substantially parallel to the transverse direction, and
   an at least partially martensite state in response to said composite sandwich structure being subjected to a relatively high force applied to said composite sandwich structure substantially parallel to the transverse direction, wherein each of a plurality of first portions of said core correspondingly changes shape to accommodate an application of the relatively high force, such that said core reversibly deforms.

2. The composite sandwich structure according to claim 1, wherein said core has a stiffness in the substantially fully austenite state, said core is further configured such that said core substantially retains the stiffness after said core has transformed to the at least partially martensite state and back to the substantially fully austenite state.

3. The composite sandwich structure according to claim 1, wherein said austenite finish transition temperature of said shape memory alloy is less than or equal to a lower end value of an expected operating temperature range of the vehicle.

4. The composite sandwich structure according to claim 1, wherein said austenite finish transition temperature is about −15 degrees Celsius.

5. The composite sandwich structure according to claim 1, wherein said shape memory alloy exhibits superelastic properties within a predetermined superelastic temperature range, and an expected operating temperature range of the vehicle is substantially contained within said superelastic temperature range.

6. The composite sandwich structure according to claim 1, wherein said shape memory alloy is Nitinol.

7. The composite sandwich structure according to claim 1, wherein said core comprises a thin-walled, fluted shape.

8. The composite sandwich structure according to claim 7, wherein said core further comprises a plurality of first interface portions and a plurality of second interface portions, each of said plurality of web portions extends between one of said plurality of first interface portions and one of said plurality of second interface portions.

9. An aircraft comprising:
   a composite sandwich structure comprising:
   a first sheet comprising a first surface and an opposing second surface, wherein a transverse direction is defined normal to said second surface of said first sheet;
   a second sheet opposite said first sheet; and
   a core coupled between said first and second sheets, said core is formed from a shape memory alloy having an austenite finish transition temperature within a range of about −35 degrees Celsius to about −10 degrees Celsius, said shape memory alloy comprises a plurality of web portions that each extend from said first sheet to said second sheet, said core is configured to reversibly transform between:

a substantially fully austenite state in response to said composite sandwich structure being subjected to a relatively low force applied substantially parallel to the transverse direction, and an at least partially martensite state in response to said composite sandwich structure being subjected to a relatively high force applied to said composite sandwich structure substantially parallel to the transverse direction, wherein each of a plurality of first portions of said core correspondingly changes shape to accommodate an application of the relatively high force, such that said core reversibly deforms.

10. The aircraft according to claim 9, wherein said core has a stiffness in the substantially fully austenite state, said core is further configured such that said core substantially retains the stiffness after said core has transformed to the at least partially martensite state and back to the substantially fully austenite state.

11. The aircraft according to claim 9, wherein said austenite finish transition temperature of said shape memory alloy is less than or equal to a lower end value of an expected operating temperature range of the aircraft.

12. The aircraft according to claim 9, wherein said austenite finish transition temperature is about −15 degrees Celsius.

13. The aircraft according to claim 9, wherein said shape memory alloy exhibits superelastic properties within a predetermined superelastic temperature range, and an expected operating temperature range of the aircraft is substantially contained within said superelastic temperature range.

14. The aircraft according to claim 9, wherein said shape memory alloy is Nitinol.

15. The aircraft according to claim 9, wherein said core comprises a thin-walled, fluted shape.

16. The aircraft according to claim 15, wherein said core further comprises a plurality of first interface portions and a plurality of second interface portions, each of said plurality of web portions extends between one of said plurality of first interface portions and one of said plurality of second interface portions.

17. A method of forming a composite sandwich structure for a vehicle, said method comprising:

coupling a core between a first sheet and a second sheet to form the composite sandwich structure, wherein a transverse direction is defined normal to a second surface of the first sheet, and wherein the core is formed from a shape memory alloy having an austenite finish transition temperature within a range of about −35 degrees Celsius to about −10 degrees Celsius, the shape memory alloy including a plurality of web portions that each extend from the first sheet to the second sheet, wherein the core is configured to reversibly transform between:

a substantially fully austenite state in response to the composite sandwich structure being subjected to a relatively low force applied substantially parallel to the transverse direction, and an at least partially martensite state in response to the composite sandwich structure being subjected to a relatively high force applied to the composite sandwich structure substantially parallel to the transverse direction, wherein each of a plurality of first portions of the core correspondingly changes shape to accommodate an application of the relatively high force, such that the core reversibly deforms.

18. The method according to claim 17, further comprising selecting the shape memory alloy to have the austenite finish transition temperature less than or equal to a lower end value of an expected operating temperature range of the vehicle.

19. The method according to claim 17, further comprising selecting the shape memory alloy to exhibit superelastic properties within a predetermined superelastic temperature range, wherein an expected operating temperature range of the vehicle is substantially contained within the superelastic temperature range.

20. The method according to claim 17, further comprising selecting the shape memory alloy to be Nitinol.

* * * * *